United States Patent [19]

Smigel et al.

[11] Patent Number: 5,626,316
[45] Date of Patent: May 6, 1997

[54] WIRING CLIP

[75] Inventors: Robert Smigel, North Royalton; Raymond S. Laughlin, Cuyahoga Falls, both of Ohio

[73] Assignee: Erico International Corporation, Solon, Ohio

[21] Appl. No.: 410,823

[22] Filed: Mar. 27, 1995

[51] Int. Cl.⁶ ........................................... F16L 3/22
[52] U.S. Cl. .................................................. 248/68.1
[58] Field of Search ........................ 248/68.1, 74.2, 248/71, 73, 316.5, 316.7; 24/336, 555, 562, 564

[56] References Cited

U.S. PATENT DOCUMENTS

| | | | |
|---|---|---|---|
| 2,683,578 | 7/1954 | Rainey | 248/68 |
| 2,718,543 | 9/1955 | Thurman | 174/164 |
| 4,264,047 | 4/1981 | Nelson | 248/73 |
| 4,325,526 | 4/1982 | Kitagawa | 24/336 X |
| 4,611,868 | 9/1986 | Matsui et al. | 339/59 M |
| 4,840,333 | 6/1989 | Nakayama | 248/68.1 |
| 4,881,705 | 11/1989 | Kraus | 248/74.2 |
| 5,090,645 | 2/1992 | Zuercher | 248/68.1 |
| 5,141,185 | 8/1992 | Rumbold et al. | 248/71 |
| 5,144,100 | 9/1992 | Andel | 174/135 |
| 5,184,794 | 2/1993 | Saito | 248/68.1 |
| 5,463,189 | 10/1995 | Deneke et al. | 248/68.1 X |

FOREIGN PATENT DOCUMENTS

| | | | |
|---|---|---|---|
| 991431 | 5/1965 | United Kingdom . | |
| 1297663 | 11/1972 | United Kingdom | 248/73 |
| 1340537 | 12/1973 | United Kingdom | 248/73 |

OTHER PUBLICATIONS

Literature—Caddy Fasteners Newsletter, No. 236, 1990, "CJ6 Colorado Jim Cable Support", Erico Products, Inc.

Literature—Caddy Fasteners, "Caddy® Installation Instructions CJ-4 Colorado Jim Cable Support".

Literature—T-Plastech, "Kwik-Klip™ Cable Clip".

Literature—3M Electrical Products Division, "3M Brand Stak-It SIFS-1 Furring Strip Cable Stacker", 1991.

Primary Examiner—Ramon O. Ramirez
Attorney, Agent, or Firm—Renner, Otto, Boisselle, Sklar

[57] ABSTRACT

A plastic clip is fastened to a metal or wood stud to support and position multiple runs of various types of wiring or cabling. The clip keeps the wiring in compliance with the National Electric Code (NEC) Section 300-4. The clip includes a base with a short gauge flange at one end to engage the face or front corner of the stud when the base is fastened to the side of the stud. Projecting directly from the base or a neck extension of the base are two spaced hinge arms, which extend at an angle to each other. Each arm includes two interior opening cable receiving slots. Between such slots is a bulbous thinner wall pressure body section which in its undistorted condition partly restricts the openings of such slots. A similar thinner wall section forms the interior or base side of the innermost slot in each arm. When wiring or cabling is inserted in the slots when the hinge arms are open it is moderately gripped by the clip so that it is not loose, thus reducing the weight and strain of the wiring or cabling at a electrical box or other termination. The end of one arm has a projecting catch which snaps into a mating slot on the end of the other, when the arms are closed, and when closed, the bulbous thinner wall pressure body sections distort firmly wrapping and gripping the wiring or cabling. One embodiment may be also secured to the stud by the edges of different size holes in the web of the stud.

17 Claims, 2 Drawing Sheets

WIRING CLIP

DISCLOSURE

This invention relates generally as indicated to a wiring clip, and more particularly to a plastic clip for organizing and correctly spacing wiring with respect to a stud in stud wall construction.

BACKGROUND OF THE INVENTION

The National Electric Code specifies that wiring be positioned a defined safe distance (1¼ inches-3.18 cm) from the nearest edge of the framing member. If such spacing can not be maintained, the wiring has to be protected by a 1/16 inch (1.59 mm) steel plate or sleeve. The purpose of the code requirement is to prevent fasteners driven into the face of the stud and used to secure wall board to the stud, for example, from piercing or otherwise damaging non-metallic cable or other wiring systems or methods. Such wiring normally runs along the side of the stud to a box or outlet and there may be a number of runs of such wiring. Accordingly, it is necessary to provide the proper organization and discipline for such wiring as well as the required spacing.

Prior U.S. Pat. No. 5,141,185 to Rumbold et al. shows several forms of a sheet metal or wire clip which may be fastened to the side of a stud. The clips shown in such patent are sold under the trademark CADDY®. The sheet metal form is sold as the CJ6 clip while the wire form is sold as the CJ-4 clip. CADDY® is a registered trademark of Erico, Inc. of Solon, Ohio.

While such clips are very effective in establishing the proper discipline and spacing of the wire, both forms of clip may not grip the wire until they are closed. Both forms utilize an arm extending away from the side of the stud with a hinged arm which is locked over the wiring and the wiring is not usually gripped until the hinge arm is locked in place. The weight of the cables until gripped may place a strain on the electrical box termination. Also, the installer may wish to position or reposition the wiring during the installation process. To reposition the wiring with the clip disclosed in the Rumbold patent requires that the clips be opened and then reclosed. Although the Rumbold clips noted above provide a firm gripping pressure on the wiring or cabling, that pressure may vary depending upon the number of wiring or cable runs employed.

In addition to the above metallic clips, a number of plastic clips have been developed to provide wiring organization with respect to studs. Examples are the "Stak-It" cable stacker sold for furring strips and studs by the 3M Electrical Products Division of Austin, Tex. Both forms are sold as wire or cable stackers and simply comprise a rigid plastic device having a number of slots into which runs of cabling may be positioned for organization and spacing.

Another form of plastic clip is the clip sold under the trademark KWIK-KLIP by T-Plastech of Englewood, Colo. Such clip is designed to clip onto a cable run already stapled to the side of a stud and contain a set of spring fingers which open automatically to accept additional cables.

There accordingly is a need for a low cost cable clip which will space the cable according to code requirements and which will also at least lightly grip the cable when initially inserted, and firmly grip the cable when the clip is closed, all regardless of the number of cable runs used. There is also a need for such a clip which can readily be attached to wood or metal studs, and if the latter, which can be mounted in standard or punched holes in the stud web or side.

SUMMARY OF THE INVENTION

A plastic clip is secured to a metal or wood stud to support and position multiple runs of various types of wiring or cabling. The clip keeps the wiring runs at least 1.25 inches (3.18 cm) from the face of the stud to ensure compliance with the National Electric Code (NEC) Section 300-4. The clip includes a base with a short gauge flange at one end adapted to engage the front or face corner of the stud if the base is affixed to the side of the stud. The base includes relatively thick pads through which fasteners such as screws or nails may be driven. Projecting from the base at the required distance from the gauge flange are two spaced hinge arms, which in the open position extend at an angle to each other. Each arm includes two interior opening wire or cable receiving slots. Between such slots is a bulbous thinner wall section which in its undistorted condition partly restricts the openings of such slots. A similar thinner wall section forms the interior or base side of the innermost slot in each arm.

In another form, the base includes a neck and the hinge arms are mounted on the neck projecting from the base. Convergent angled paired spring tabs project outwardly from the top of the neck and the base, respectively providing a snap-in attachment for a punched hole, or a twist-in attachment for a somewhat larger prepunched hole found in the webs of metal studs.

The clip is designed so that when wiring or cabling is inserted in the slots when the hinge arms are open it is mildly or slightly gripped by the clip so that it is not loose, thus reducing the weight and strain of the wiring or cabling at the electrical box or other termination. The distal end of one arm includes a projecting arrowhead or partial arrowhead which snaps into a mating slot on the distal end of the other arm, when the arms are closed. When the arms are closed, the bulbous thinner wall sections distort firmly wrapping and gripping the wiring or cabling. The clip can be opened simply by twisting the arms out of alignment so that the arrowhead or partial arrowhead slides out either end of the slot.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
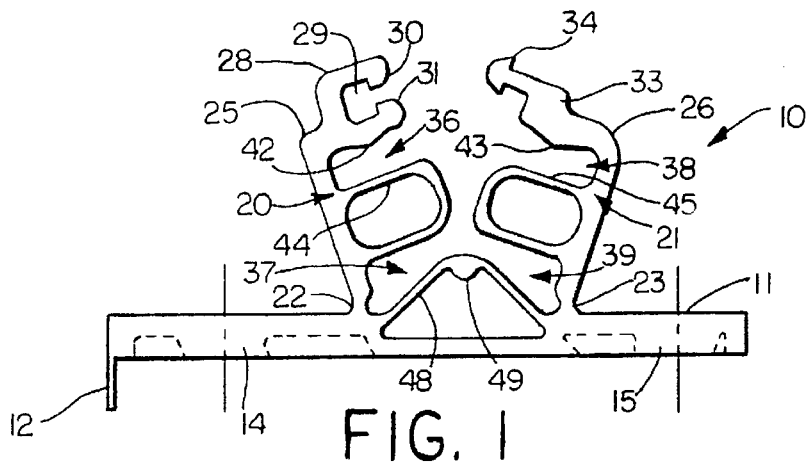
FIG. 1 is a side elevation of one form of clip in accordance with the present invention.
Figure 2:
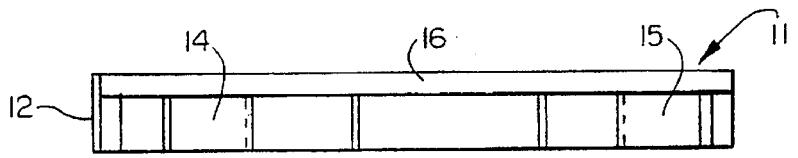
FIG. 2 is a bottom elevation of the clip of FIG. 1.

Referring now to FIGS. 1 and 2, it will be seen that there is illustrated generally at 10 one embodiment of a clip in accordance with the present invention. The clip 10 includes a base 11 which is relatively elongated and narrow which terminates at one end in a projecting relatively thin gauge flange 12. The base includes two relatively thick portions indicated at 14 and 15 through which a fastener such as a nail or screw may be driven to fasten the base to the side of a stud. The base also includes a longitudinally extending rib 16 which acts to maintain the base relatively stiff and straight as it is fastened to the stud. It will be appreciated that a wide variety of fasteners may be employed such as nails, wood screws, or sheet metal screws in the case of metal studs, or that the base may readily be stapled to the side of the stud depending upon the most convenient fastening system available.

Projecting from the base are two relatively rigid arms indicated at 20 and 21 which normally extend at the slightly angled symmetrical relationship shown in FIG. 1. The proximal end of each arm is hinged to the base with a slightly more narrow hinge section seen at 22 and 23, respectively.

The outer end of each arm is provided with a right angle inturned bend as seen at 25 and 26, respectively, with the arm 20 being enlarged as seen at 28 and being provided with an internal hammerhead slot 29 which includes cammed guide edges 30 and 31. The opposite leg 21 includes an outwardly offset portion 33 which terminates in an arrowhead 34 catch. The arms may be closed and locked together simply by pressing them toward each other and inserting the catch into the slot 29. Accordingly, the proximal ends of the arms are hinged to the base at 22 and 23 and the distal ends of the arms may be locked together through the slot and catch arrangement shown.

Each arm includes two wire or cable receiving slots. The slots for the arm 20 are shown at 36 and 37. The slots for the arm 21 are shown at 38 and 39.

It is noted that the outer edge of the slots 36 and 38 is formed by the relatively rigid distal inwardly projecting ends of the arms which are enlarged slightly as seen at 42 and 43, respectively. Situated between the slots in each arm is a bulbous thinner wall section as seen at 44 and 45. The thinner wall sections form the inner sides of the outer slots 36 and 38 and the outer sides of the inner slots 37 and 39.

Projecting from the base is a triangular thinner wall section 48 which has an internal apex bead 49. The thinner wall section 48 is in the form of an isosceles triangle and the two equal legs form the inner walls of the innermost slots 37 and 39. It is noted that the legs extend at an angle which tends to constrict the openings of the slots 37 and 39 so that one or both sides of the slot must deform as a wire is inserted into the slot.

Figure 3:
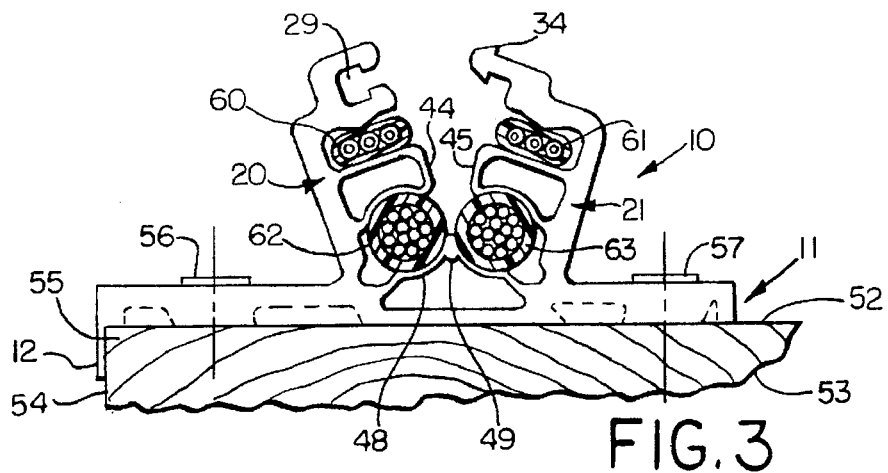
FIG. 3 is a side elevation showing the clip fastened to a stud with the arms open and different types of wiring in the wiring receiving slots.

Before the cabling is inserted as seen in FIG. 3, the base 11 is secured to the side 52 of stud 53 with the relatively thin gauge flange 12 overlying the face 54 of the stud at the front corner 55. Fasteners 56 and 57 may be employed to secure the clip to the side of the wooden stud illustrated. It will be appreciated that sheet metal screws, for example, may be employed to secure the clip to the side of a metal stud. It will be seen that in the open position a wide variety of wiring or other types of cabling may be inserted into the arm slots. It will, of course, be appreciated that the arms may open more widely than the approximate 60° included angle shown to facilitate the placement of wiring or cabling in the arm slots.

By way of illustration, the clip is shown with two generally rectangular wires 60 and 61 inserted into the slots 36 and 38. Round wires or cables 62 and 63 have been inserted in the slots 37 and 39. It is noted that the middle bulbous thin walled portions 44 and 45 have somewhat distorted upon the insertion of the cabling as well as the relatively thin walled bottom section 48 on each side of the apical inverted bead 49. When the wiring or cabling is inserted as in FIG. 3, the slight compression or distortion of the slot walls provides an intermediate or mild gripping pressure on the wiring or cabling which supports some of the weight of the cable or wiring and relieves the stress on the wiring at the junction box, for example, during the installation process.

Figure 4:
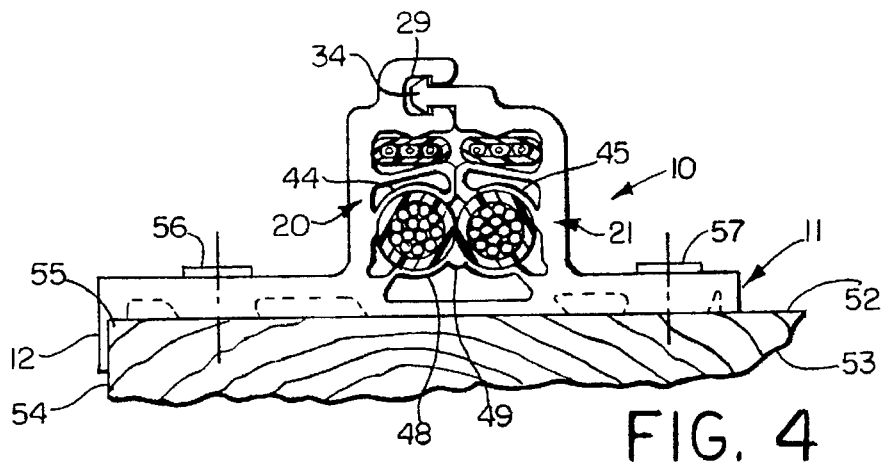
FIG. 4 is a view similar to FIG. 3 illustrating the clip closed and the distortions of portions of the clip which take place.

When the installer is satisfied with the position of his cable, the arms of the clip are simply snapped locked together as in FIG. 4 with the catch 34 entering the slot 29. In such closed condition, significant distortion of the thin walled sections 44 and 45 occurs as well as the thin walled section 48 on both sides of the bead 49. In the closed and locked position of FIG. 4, significant gripping pressure is obtained. Significant locking pressure is obtained even if one or more of the slots in the clip is empty. If the installer is not satisfied with the position of the cabling or wiring upon the closing of the clip, the clip can readily be opened simply by offsetting the distal ends of the arms from the plane of FIG. 4. The catch readily slides out either end of the slot and the arms will spring back or revert to their open position seen in FIG. 3. The clip may readily be molded from high strength plastic such as nylon or the like.

Figure 5:
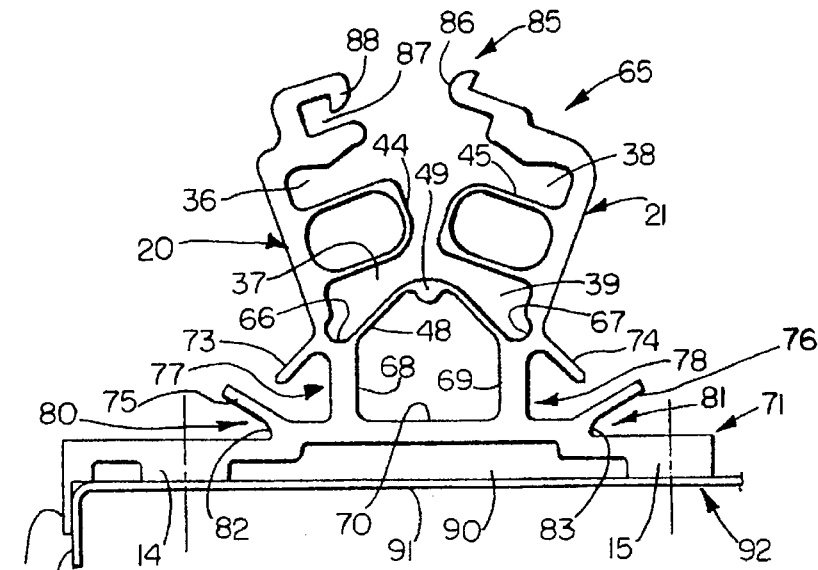
FIG. 5 is a view like FIG. 1 of a somewhat modified form of clip mounted on the exterior of a metal stud.
Figure 6:
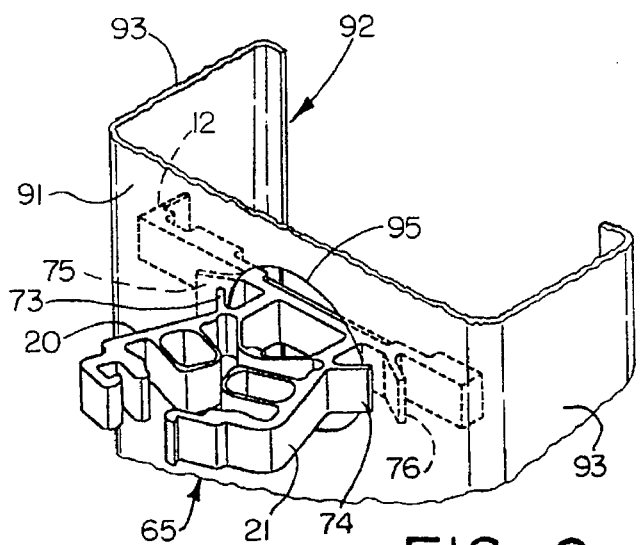
FIG. 6 is a fragmentary perspective view of the clip of FIG. 5 mounted in a punched circular hole of a metal stud with the web hole edges caught between the convergent spring tabs.
Figure 7:
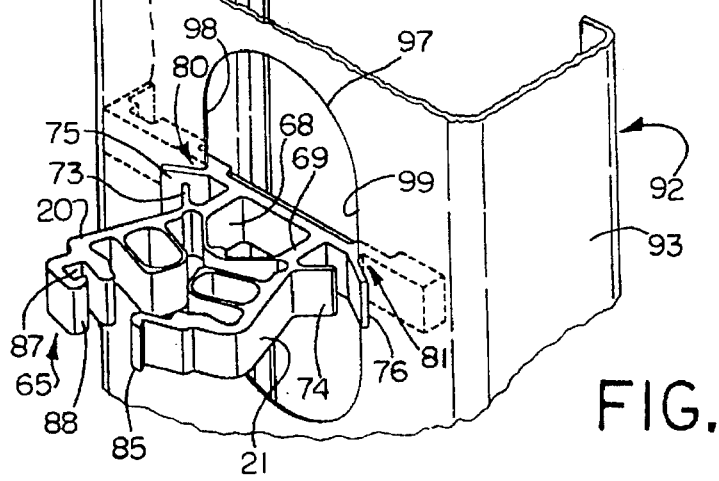
FIG. 7 is a similar perspective view of the clip of FIG. 5 twisted into a somewhat larger prepunched hole with the web hole edges caught beneath the angled spring tabs projecting from the base.

Referring now to FIGS. 5, 6 and 7, there is illustrated generally at 65 another form of the present invention preferred for metal studs, although equally usable with wooden studs and secured to wooden studs in the same manner as in FIG. 3. Since many parts of the clip are the same as the FIG. 1 embodiment, additional reference numerals will be used only with the differences which will be described in detail. As seen in FIG. 5, the arms 20 and 21 hinge to an extended base at 66 and 67, such base extension being formed by two relatively rigid spaced projections 68 and 69 extending from a slightly elevated center section 70 of base section 71. The two projections form a neck spacing the arms from the base section 71. The projections are bridged by the triangular thinner wall section 48 provided with the internal apical bead 49.

Extending from the top of each projection are outwardly angled spring tabs 73 and 74 which point toward the base and at spring tabs 75 and 76 which project from the base section 71 at each end of the somewhat enlarged center section 70. The tabs on each side of the neck converge toward each other and yet are offset with the tabs on the base being further laterally spaced. The converging tabs form pockets seen at 77 and 78. The tips of the tabs are such that the tabs overlap and have to deflect if a stud web is positioned in the pockets with the neck extending through a hole in the web. This mounting of the clip is seen in FIG. 6.

The tabs 75 and 76 extend symmetrically on opposite sides of the neck at about 30° to the base section and the notches formed with the base section, shown at 80 and 81, include a more steeply angled short portion, about 70°, which acts as a short wedge surface. The short wedge angle surfaces are shown at 82 and 83. The angled surfaces are radiused into the adjoining surfaces. The mounting of the clip using the wedge notches is shown in FIG. 7.

The outer or distal end of the leg 21 terminates in a projecting half-arrowhead catch 85 having a rounded tip 86 which is adapted to enter facing slot 87 on the distal end of leg 20 having a similar half-arrowhead configuration on its outer lip as seen at 88. This provides a restricted opening and the two legs are locked together when the tip 85 is forced into the slot 87 with the shoulders formed by the trailing portion of the arrowheads overlapping and locking the legs together. As in the FIG. 1 embodiment, the clip can be opened simply by offsetting the ends from the plane of the Figure. Also as in the FIG. 1 embodiment, each arm includes two wire or cable receiving slots seen at 36 and 37 for the arm 20, and at 38 and 39 for the arm 21. Such paired slots are separated by the thinner wall bulbous section 44 and 45, respectively.

The base section 71 includes a central ridge 90 extending the length of the base and also has the thin gauge flange 12 and the two thicker portions 14 and 15 through which fasteners may be employed to secure the clip to the outside of the web 91 of metal stud 92. As illustrated in FIG. 5, the gauge flange 12 is overlapping the face 93 and positioning the wiring the required distance from the nearest edge.

Referring now to FIG. 6, there is illustrated a typical metal stud 92 which is of the open channel configuration shown. The web 91 extends between the opposite faces 93 to which wallboard, for example, is secured. In FIG. 6, the web is shown with a circular punched hole 95. For electrical installers, it is typical to punch such a hole in the web of a stud for running wiring through the hole with the aid of a grommet. Reference may be had to the copending application of Edward J. Lynch et al., Ser. No. 08/299,548, filed Sep. 1, 1994, entitled Metal Stud Grommet, for a disclosure of such punched circular holes and how they are used. The hole may be approximately 1.344" (3.41 cm) in diameter. The clip is inserted by closing the legs and then inserting the closed legs from the opposite side of the stud illustrated. The spring tabs 73 and 74 will fold back along the neck and the tabs 75 and 76 will be flattened against the base. When the tips of the tabs 73 and 74 clear the edge of the hole, they will snap back so that the web on each side of the hole is caught in the pockets 77 and 78. The hole will normally be placed in the center of the web and the position of the clip seen in FIG. 6 will normally more than meet the code required spacing. In such position, the gauge flange 12 gauges against the inside of the face, and if necessary, pushes the clip to an eccentric position with regard to the hole.

In FIG. 7, there is illustrated the stud 92 with a prepunched hole shown at 97. Most studs are manufactured with prepunched holes which are usually vertically elongated and of a standard 1.5" (3.81 cm) width. The clip is inserted through the hole from the far side with the base in a vertically oriented position. The clip is then twisted so that the lateral edges 98 and 99 of the hole wedge into the notches 80 and 81 against the wedge surfaces 82 and 83, respectively. The gauge flange 12 will closely clear the face 93 and the wiring supported by the clip will meet code requirements. If the hole 97 is sufficiently vertically elongated, the clip may be inserted from the near side of the stud by placing the base through the hole before twisting into alignment with the wedge notches 80 and 81. Although not necessary, it will be appreciated that fasteners may additionally be employed in FIGS. 6 and 7.

It will accordingly be seen that the clip of FIG. 5 may be mounted to the exterior of the side of a wood or metal stud with fasteners as seen in FIG. 5. It may also be mounted to project from punched or prepunched holes as in FIGS. 6 and 7.

In any event, there is provided a low cost easy to install clip which even in the open position provides some gripping pressure on the wiring or cabling and when closed, firmly grips the cabling or wiring and also properly disciplines the wiring and spaces it from the face of the stud.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A one piece cable clip comprising a base adapted to be secured to a stud, two arms extending outwardly from the base, each arm having cable receiving slots, said arms being movable from an open cable receiving position to a closed locked position, and said clip including means to constrict said slots as the arms move to the closed position firmly to grip the cable when closed, said arms extending generally parallel to each other when closed.

2. A clip as set forth in claim 1 wherein the arms extend outwardly from said base symmetrically at an angle to each other and to said base when open.

3. A clip as set forth in claim 1 including a catch on the distal end of one arm, and a recess on the distal end of the other adapted to receive the catch in a snap lock relationship when the arms are closed.

4. A clip as set forth in claim 3 wherein said recess is open at each edge of the clip so that the arms may be opened by offsetting the arms one from the other.

5. A clip as set forth in claim 1 including thin wall bulbous sections at least partially forming said slots operative to deform to some extent when the cable is initially inserted in the slots, and to a greater extent when the arms are closed firmly to grip the cable.

6. A cable clip as set forth in claim 1 wherein said base includes a neck supporting said arms, and spring tab means projecting from said clip to secure said clip to the edges of a hole in the stud.

7. A clip as set forth in claim 6 including a pair of converging tabs on each side of said neck, each pair forming pockets adapted to grasp the edges of a hole of one size in a stud.

8. A clip as set forth in claim 7 wherein one tab of each pair and the base form pockets adapted to grasp the edges of a hole of another size in a stud.

9. A one piece cable clip comprising a base adapted to be secured to a stud, two arms extending outwardly from the base, each arm having cable receiving slots, said arms being movable from an open cable receiving position to a closed locked position, and said clip including means to constrict said slots as the arms move to the closed position firmly to grip the cable when closed, and wherein said clip including means to exert some gripping pressure on the cable when in said cable receiving slots and before said arms are closed.

10. A clip for securing wiring to the side of a stud spaced a required distance from the face of a stud, comprising a base adapted to be secured to the stud, a pair of arms extending outwardly from the base, said arms being hinged to the base and when open extending at an angle to each other, at least one wire receiving slot in each arm, each slot being formed at least in part by a distortable pressure body operative to grip the wiring to some extent when first inserted in the slot, and to a greater extent when the arms are closed and locked together, said base including a gauge flange at one end on the opposite side of the base as the arms adapted to engage the face of the stud to ensure the required spacing of the wiring from the face of the stud.

11. A clip as set forth in claim 10 including at least two slots in each arm, and said bodies including thin wall bulbous sections at least partially forming said slots and being operative to deform to some extent when the wiring is initially inserted in the slots, and to a greater extent when the arms are closed firmly to grip the wiring.

12. A clip as set forth in claim 11 wherein said arms extend generally parallel to each other when closed.

13. A clip as set forth in claim 12 including a catch on the distal end of one arm, and a recess on the distal end of the other adapted to receive the catch in a snap lock relationship when the arms are closed.

14. A clip as set forth in claim 13 wherein said recess is open at each edge of the clip so that the arms may be opened by offsetting the arms one from the other.

15. A clip as set forth in claim 10 wherein said base includes a neck supporting said arms, and spring tab means projecting from said clip to secure said clip to the edges of a hole in the stud.

16. A clip as set forth in claim 15 including a pair of converging tabs on each side of said neck, each pair forming pockets adapted to grasp the edges of a hole of one size in a stud.

17. A clip as set forth in claim 16 wherein one tab of each pair and the base form pockets adapted to grasp the edges of a hole of another size in a stud.

* * * * *